United States Patent
Lai et al.

(10) Patent No.: US 12,252,448 B1
(45) Date of Patent: Mar. 18, 2025

(54) ENGINEERED STONE AND MANUFACTURING METHOD THEREOF

(71) Applicant: QUEEN CERAMIC INCORPORATION, Taipei (TW)

(72) Inventors: Cheng-Hsuan Lai, Taipei (TW); Wei-Min Chen, Taipei (TW); Lei Lin, Taipei (TW)

(73) Assignee: QUEEN CERAMIC INCORPORATION, Taipei (TW)

( * ) Notice: Subject to any disclaimer, the term of this patent is extended or adjusted under 35 U.S.C. 154(b) by 0 days.

(21) Appl. No.: 18/585,022

(22) Filed: Feb. 22, 2024

(30) Foreign Application Priority Data

Dec. 25, 2023 (TW) .................................. 112150632

(51) Int. Cl.
| | | |
|---|---|---|
| *C04B 14/06* | (2006.01) | |
| *B28B 1/00* | (2006.01) | |
| *C04B 14/30* | (2006.01) | |
| *C04B 18/167* | (2023.01) | |
| *C04B 26/02* | (2006.01) | |
| *C04B 41/00* | (2006.01) | |
| *C04B 41/45* | (2006.01) | |
| *C09D 11/033* | (2014.01) | |
| *C09D 11/037* | (2014.01) | |
| *C04B 103/54* | (2006.01) | |

(52) U.S. Cl.
CPC .......... *C04B 41/4513* (2013.01); *B28B 1/005* (2013.01); *C04B 14/06* (2013.01); *C04B 14/303* (2013.01); *C04B 18/167* (2013.01); *C04B 26/02* (2013.01); *C04B 41/0072* (2013.01); *C09D 11/033* (2013.01); *C09D 11/037* (2013.01); *C04B 2103/54* (2013.01)

(58) Field of Classification Search
CPC ... C04B 41/4513; C04B 14/06; C04B 14/303; C04B 18/167; C04B 26/02; C04B 41/007; C04B 2103/54; C09D 11/033; C09D 11/037; B28B 1/005

USPC .......................................................... 264/132
See application file for complete search history.

(56) References Cited

U.S. PATENT DOCUMENTS

| | | | |
|---|---|---|---|
| 2019/0201928 A1* | 7/2019 | Xie .......................... | B05C 9/10 |
| 2022/0072887 A1 | 3/2022 | Ding | |
| 2023/0139870 A1 | 5/2023 | Adams et al. | |

FOREIGN PATENT DOCUMENTS

| | | |
|---|---|---|
| CN | 103753996 B | 11/2015 |
| CN | 110202994 A | 9/2019 |
| CN | 111393184 A | 7/2020 |
| CN | 113183292 B | 8/2022 |
| CN | 219600802 U | 8/2023 |

OTHER PUBLICATIONS

English Translation of CN 110202994 (Year: 2019).*
English Translation of CN 103753996 (Year: 2015).*

* cited by examiner

*Primary Examiner* — Hannah J Pak
(74) *Attorney, Agent, or Firm* — CKC & Partners Co., LLC

(57) ABSTRACT

In the present disclosure, an engineered stone is provided. The engineered stone includes a first full-body stone pattern, a second full-body stone pattern and a printed stone pattern. The first full-body stone pattern includes a first stone formulation. The second full-body stone pattern includes a second stone formulation, and the second stone formulation is different from the first stone formulation, wherein the first full-body stone pattern and the second full-body stone pattern are located on a front surface, a plurality of side surfaces and a back surface opposite to the front surface of the engineered stone. The printed stone pattern is located on the front surface of the engineered stone, and the printed stone pattern is overlapped with the first full-body stone pattern and the second full-body stone pattern.

8 Claims, 6 Drawing Sheets

ENGINEERED STONE AND MANUFACTURING METHOD THEREOF

CROSS-REFERENCE TO RELATED APPLICATION

This application claims priority to Taiwan Application Serial Number 112150632, filed Dec. 25, 2023, which is herein incorporated by reference in its entirety.

BACKGROUND

Field of Invention

The present disclosure relates to an engineered stone. More particularly, the present disclosure relates to a stone pattern printing method for the engineered stone.

Description of Related Art

With the rise of environmental awareness, in order to reduce the mining of natural stones, people began to develop engineered stone slabs that imitating natural stone slabs. In order to produce realistic engineered stone slabs, the manufacturing process of engineered stone slabs has become more complicated, which often leads to errors in the vein pattern of the stone slabs due to different operators.

Accordingly, the present disclosure provides a method that may produce realistic engineered stone slabs stably and simply.

SUMMARY

In accordance with an aspect of the present disclosure, a manufacturing method of an engineered stone is provided. A photo of a natural stone slab is taken to obtain a stone slab photo. The stone slab photo is imported into a color mapping software, wherein a background pattern and a vein pattern are designed, and a plurality of reference points are set based on the stone slab photo. A stone mold is designed based on the background pattern and the vein pattern, wherein a plurality of mold reference points are set in the stone mold based on the plurality of reference points. A full-body stone slab is formed with the stone mold, wherein a plurality of alignment marks is made on a front surface of the full-body stone slab, and the plurality of alignment marks corresponding to the plurality of mold reference points of the stone mold. The vein pattern is sprayed onto a first surface of a paper with a weather-resistant ink. Holes are cut on the paper to form a plurality of reference point holes, and the plurality of reference point holes corresponding to the positions of the reference points of the vein pattern. The first surface of the paper is covered on the front surface of the full-body stone slab, and the plurality of reference point holes on the paper is aligned with the plurality of alignment marks on the full-body stone slab, respectively. A thermal transfer process is performed to transfer the vein pattern to the front surface of the full-body stone slab.

According to some embodiments of the present disclosure, wherein forming the full-body stone slab includes preparing a first stone formulation and a second stone formulation based on the background pattern; and disposing the first stone formulation into a first area of the stone mold to form a first full-body stone pattern, and disposing the second stone formulation into a second area of the stone mold to form a second full-body stone pattern.

According to some embodiments of the present disclosure, wherein the first full-body stone pattern and the second full-body stone pattern are located on the front surface, a plurality of side surface and a back surface of the full-body stone slab, wherein the back surface is opposite to the front surface.

According to some embodiments of the present disclosure, wherein a number of the plurality of reference points is at least three.

According to some embodiments of the present disclosure, wherein taking the photo of the natural stone slab includes using a uniform light source and placing a color calibration plate next to the natural stone slab.

According to some embodiments of the present disclosure, wherein performing a thermal transfer process includes setting a temperature of a heat press machine between 14° and 200° C., and placing the full-body stone slab in the heat press machine for 15 to 30 minutes.

According to some embodiments of the present disclosure, wherein the weather-resistant ink includes 55-65% by weight of deionized water, 8-12% by weight of propylene glycol, 12-15% by weight of glycerin, 10-20% by weight of dispersing dye, 10-20% by weight of wetting and dispersing agent, 0.2-1.5% by weight of UV absorber, and 0.5 to 2% by weight of hindered amine light stabilizer.

According to some embodiments of the present disclosure, wherein prior to performing the thermal transfer process, a polishing process is performed on the front surface of the full-body stone slab.

In accordance with an aspect of the present disclosure, an engineered stone is provided. The engineered stone includes a first full-body stone pattern, a second full-body stone pattern and a printed stone pattern. The first full-body stone pattern includes a first stone formulation. The second full-body stone pattern includes a second stone formulation, and the second stone formulation is different from the first stone formulation, wherein the first full-body stone pattern and the second full-body stone pattern are located on a front surface, a plurality of side surfaces and a back surface opposite to the front surface of the engineered stone. The printed stone pattern is located on the front surface of the engineered stone, and the printed stone pattern is overlapped with the first full-body stone pattern and the second full-body stone pattern.

According to some embodiments of the present disclosure, wherein the first stone formulation and the second stone formulation includes recycling building material, aluminum hydroxide, quartz powder, resin and pigment.

According to some embodiments of the present disclosure, wherein a color of the first full-body stone pattern is different from the color of the second full-body stone pattern.

According to some embodiments of the present disclosure, wherein the first full-body stone pattern extends from the front surface to the back surface of the engineered stone.

According to some embodiments of the present disclosure, wherein the second full-body stone pattern extends from the front surface to the back surface of the engineered stone.

According to some embodiments of the present disclosure, wherein a penetration depth of the printed stone pattern on the front surface of the engineered stone is 1 to 5 millimeter (mm).

According to some embodiments of the present disclosure, further including a third full-body stone pattern. The third full-body stone pattern includes a third stone formulation, and the third stone formulation is different from the first stone formulation and the second stone formulation, wherein the third stone formulation is located on the front surface and one of the plurality of side surfaces of the engineered stone.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
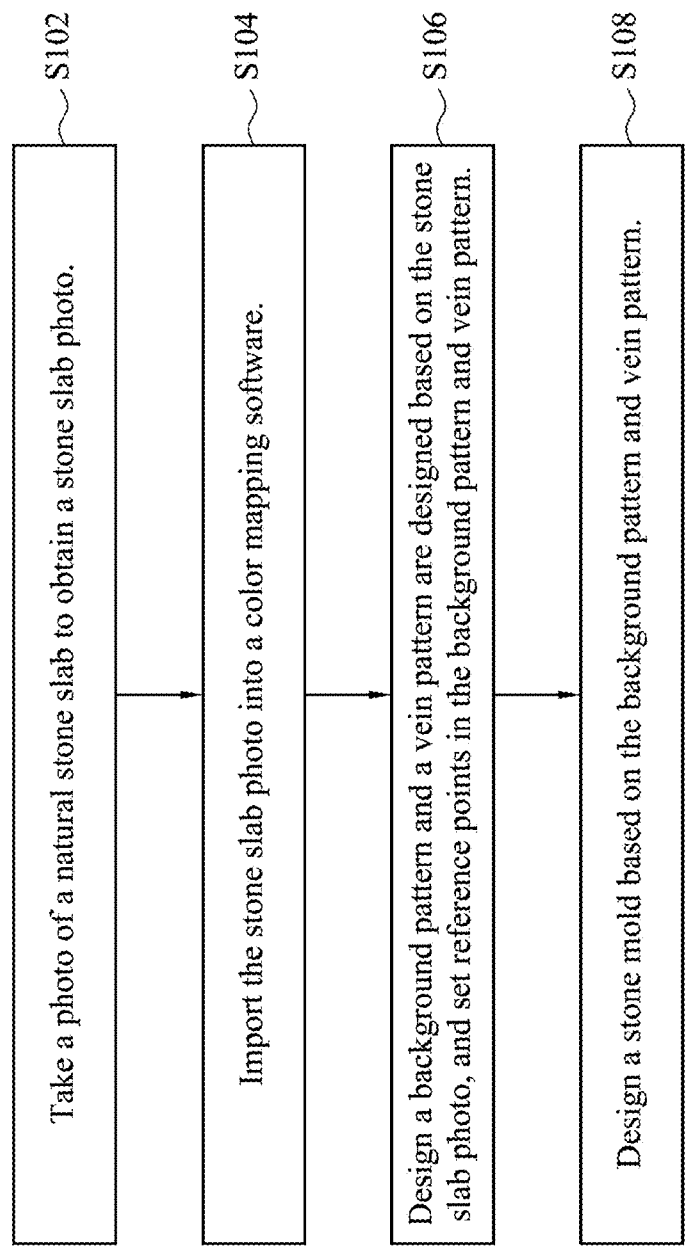
FIG. 1 is a flowchart of a color mapping method for designing the stone pattern, in accordance with some embodiments.

Reference will now be made in detail to the present embodiments of the disclosure, examples of which are illustrated in the accompanying drawings. Wherever possible, the same reference numbers are used in the drawings and the description to refer to the same or like parts.

Although a series of operations or steps are used to illustrate the method of the present disclosure, the order shown in these operations or steps should not be construed as a limitation of the disclosure. For example, certain operations or steps may be performed in a different order and/or concurrently with other steps. Furthermore, not all illustrated operations, steps, and/or features must be performed to implement embodiments of the present disclosure, and each operation or step described herein may include several sub-steps or actions.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The present disclosure provides a method for manufacturing engineered stone. FIG. 1 is a flowchart of a color mapping method 100 for designing the stone pattern, in accordance with some embodiments. In step S102, first, a photo of a natural stone slab is taken to obtain a stone slab photo. In some embodiments, the natural stone slab is photographed under a uniform light source with a color calibration plate placed nearby. In some embodiments, the natural stone slab can be a quartz slab, a marble slab, a granite slab, etc., and a suitable natural stone slab can be selected according to actual design requirements.

In step S104, the stone slab photo is imported into a color mapping software. Then, the stone slab photo is compared with pre-imported templates in color mapping software. In some embodiments, multiple stone slab photos can be obtained and compared multiple times in color mapping software to obtain accurate RGB values of the background color and vein pattern of the natural stone slab.

In step S106, in the color mapping software, a background pattern and a vein pattern are designed based on the stone slab photo(s), and reference points are set in the background pattern and vein pattern. The background pattern is the basic background color of the stone slab, and the vein pattern is the detailed texture being printed on the engineered stone, which will be described in detail later. In some embodiments, three reference points are set. In other embodiments, more than three reference points may be set. The reference points can be set at a position that will not change in subsequent processes, such as the intersection of background pattern and/or the intersection of vein pattern.

In step S108, a stone mold is designed based on the background pattern and the vein pattern, wherein corresponding mold reference points are set in the stone mold according to the reference points. In some embodiments, after designing the stone mold, the stone mold can be produced through laser cutting, computer numerical control (CNC) machine tool or 3D printing.

Figure 2:
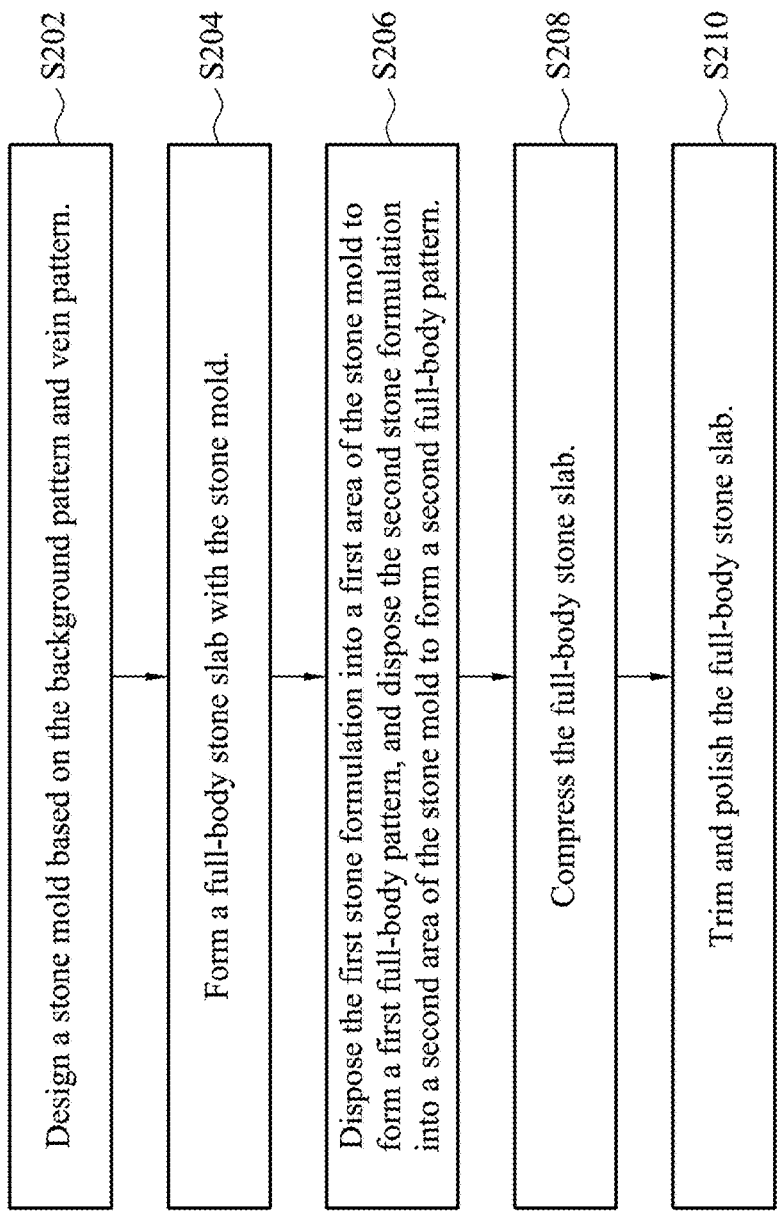
FIG. 2 is a flowchart of a method for manufacturing a full-body stone slab, in accordance with some embodiments.

FIG. 2 is a flowchart of a method 200 for manufacturing a full-body stone slab, in accordance with some embodiments. In step S202, first, a first stone formulation and a second stone formulation are prepared based on the background pattern.

In some embodiments, the first stone formulation and the second stone formulation includes quartz powder unsaturated polyester resin, coupling agent, curing agent, dispersing agent, and pigment. For example, the first slate formulation and the second slate formulation include 25-35% by weight of quartz powder with an average particle size of 0.2-0.4 millimeters (mm), and 30-40% by weight of quartz powder with an average particle size of 0.1-0.2 mm, 20-30% by weight of quartz powder with an average particle size of 0.045 mm, 5.5-15.5% by weight of unsaturated polyester resin, 0.05-0.22% by weight of coupling agent, 0.07-0.18% by weight of dispersing agent, and 0.2-0.8 by weight of pigment.

In some embodiments, the first stone formulation and the second stone formulation includes are environmentally friendly formulation, including recycling building material, aluminum hydroxide, quartz powder, unsaturated polyester resin, coupling agent, dispersing agent, and pigment. For example, the first slate formulation and the second slate formulation include 20-70% by weight of recycling building material with an average particle size of 0.1-0.6 mm, 10-30% by weight of aluminum hydroxide with an average particle size of 0.012-0.018 mm, 20-35% by weight of quartz powder with an average particle size of 0.2-0.4 mm, 15-30% by weight of quartz powder with an average particle size of 0.1-0.2 mm, 10-25% by weight of quartz powder with an average particle size of 0.045 mm, 5.5-15.5% by weight of unsaturated polyester resin, 0.05-0.22% by weight of coupling agent, 0.5-2% by weight of dispersing agent, and 0.2-0.8 by weight of pigment.

The method of preparing the first stone formulation includes the following steps. First, the resin material is prepared by putting the unsaturated polyester resin, coupling agent, dispersant, and curing agent into the dispersion tank and stirring evenly. Next, the coloring material is prepared by putting the unsaturated polyester resin and dispersing agent into another dispersion tank, stirring evenly and then slowly adding the pigment. Then, the quartz powder of each particle size is put into another dispersion tank in advance and is stirred evenly. Then, the resin material and coloring material are added and stirred evenly. Next, repeat the above steps to prepare the second stone formulation.

In some embodiments, the pigment of the first stone formulation and the second slate formulation are different. For example, the first stone formulation is green and the second slate formulation is light yellow. In some embodiments, the first stone formulation and the second slate formulation have different proportions of quartz powder in each particle size.

In some embodiments, the full-body stone slab can include more kinds of stone formulations. For example, the full-body stone slab includes four different color stone formulations to produce a full-body stone slab with more complex pattern.

In step S204, a full-body stone slab is formed with the stone mold, wherein alignment marks are made on a front surface of the full-body stone slab, and the alignment marks corresponding to the mold reference points of the stone mold. In some embodiments, the front surface of the full-body stone slab may be 3200 mm by 1600 mm. In other words, the length and/or width of the full-body stone slab can be between 1600 mm and 3200 mm. In some embodiments, the thickness of the full-body stone slab may be between 15 mm and 30 mm.

In step S206, the first stone formulation is disposed into a first area of the stone mold to form a first full-body stone pattern, and the second stone formulation is disposed into a second area of the stone mold to form a second full-body stone pattern. The first full-body stone pattern and the second full-body stone pattern extend from the front surface to the back surface of the full-body stone slab. In other words, the first full-body stone pattern and the second full-body stone pattern are not only located on the front and back of the full-body stone slab, but also on the side surfaces of the full-body stone slab. In other embodiments, the method includes forming a third full-body stone pattern, wherein the third full-body stone pattern is located on the front surface and one of the side surfaces of the full-body stone slab, or on the back surface and the side surfaces of the full-body stone slab. That is, it is also possible to form a pattern that does not completely extend from the front surface to the back surface, for example, the pattern extends on at least one surface of the stone slab.

Prior to perform step S208, separate the stone mold and the full-body stone slab. In step S208, the full-body stone slab is compressed. For example, the full-body stone slab is placed in a vibro-compaction machine and is compressed for 10-15 minutes. Then the full-body stone slab is placed in a curing device and at a temperature between 7° and 120° C. for 70 to 140 minutes.

Subsequent to the full-body stone slab is formed, in step S210, a polish process is performed to polish the surface of the full-body stone slab. In some embodiments, the front surface of the full-body stone slab is polished. In other embodiments, the front surface, back surface and side surfaces of the full-body stone slab are polished.

Figure 3:
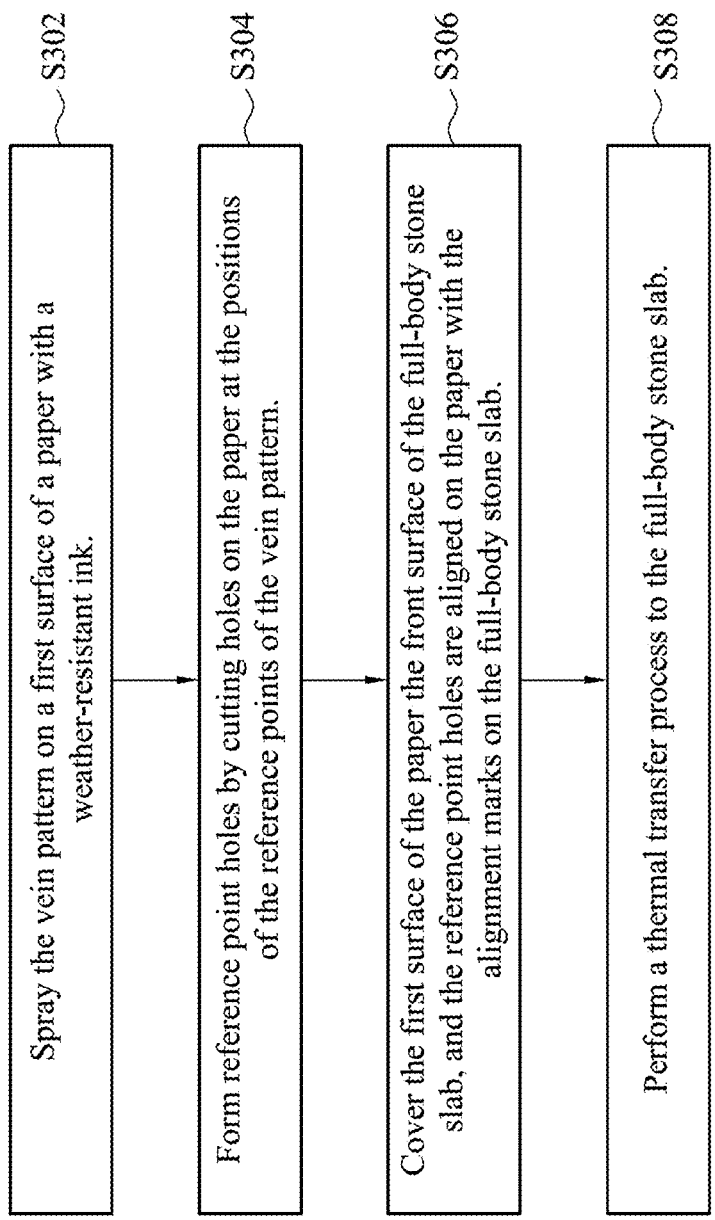
FIG. 3 is a flowchart of a positioning printing method, in accordance with some embodiments.

FIG. 3 is a flowchart of a positioning printing method 300, in accordance with some embodiments. In step S302, the vein pattern is sprayed on a first surface of a paper with a weather-resistant ink. In some embodiments, a roll-to-roll digital inkjet printer is used, with a printhead resolution of 720 dpi/2 rows. In some embodiments, the weather-resistant ink includes deionized water, propylene glycol, glycerin, resin, pigments, and additives. For example, the weather-resistant ink includes 55-65% by weight of deionized water, 8-12% by weight of propylene glycol, 12-15% by weight of glycerin, 10-20% by weight of dispersing dye, 10-20% by weight of wetting and dispersing agent, 0.2-1.5% by weight of UV absorber. In some embodiments, the weather-resistant inkjet may include 0.5-2% by weight of hindered amine light stabilizer, 0.02-0.4% by weight of bactericide, and/or 0.4-0.8% by weight of pH adjuster. The hindered amine light stabilizer may make disperse dyes less susceptible to discoloration or fading. The formula of the above-mentioned weather-resistant inkjet can stably discharge ink from the nozzle without settling, so there will be no color bleeding when sprayed on the drawing.

In step S304, holes are cut on the paper at the positions of reference points of the vein pattern to form reference point holes. In step S306, the first surface of the paper is covered on the front surface of the full-body stone slab, and the reference point holes are aligned on the paper with the alignment marks on the full-body stone slab, respectively. By aligning the reference point holes with the alignment marks of the full-body stone slab, the vein pattern can be smoothly aligned to the preset position to improve the accuracy of the printed pattern and create an engineered stone with exquisite and realistic vein pattern.

In step S308, a thermal transfer process is performed on the full-body stone slab to transfer the texture pattern to the front surface of the full-body stone slab. In some embodiments, the aligned paper and the full-body stone slab are placed into a heat press device the temperature is set between 14° and 200° C., and left for 15 to 30 minutes. In some embodiments, subsequent to the thermal transfer process, a cooling process is performed to cool the full-body stone slab for a period of time.

In some embodiments, subsequent to the thermal transfer process, the weather-resistant ink penetrates to a depth of about 1 to 5 mm on the front side of the solid stone slab. The wetting and dispersing agent in the weather-resistant ink in the present disclosure has a segmented polymer with a high degree of structural regularity, and has both alkaline and acidophilic dual-affinity polar functional groups. The amphiphilic polar functional groups in the wetting and dispersing agent coat the dye molecules and combine with the resin materials and quartz materials in the engineered stone through electrostatic force and dipole force, so that the dye can be stably fixed in the engineered stone.

Figure 4:
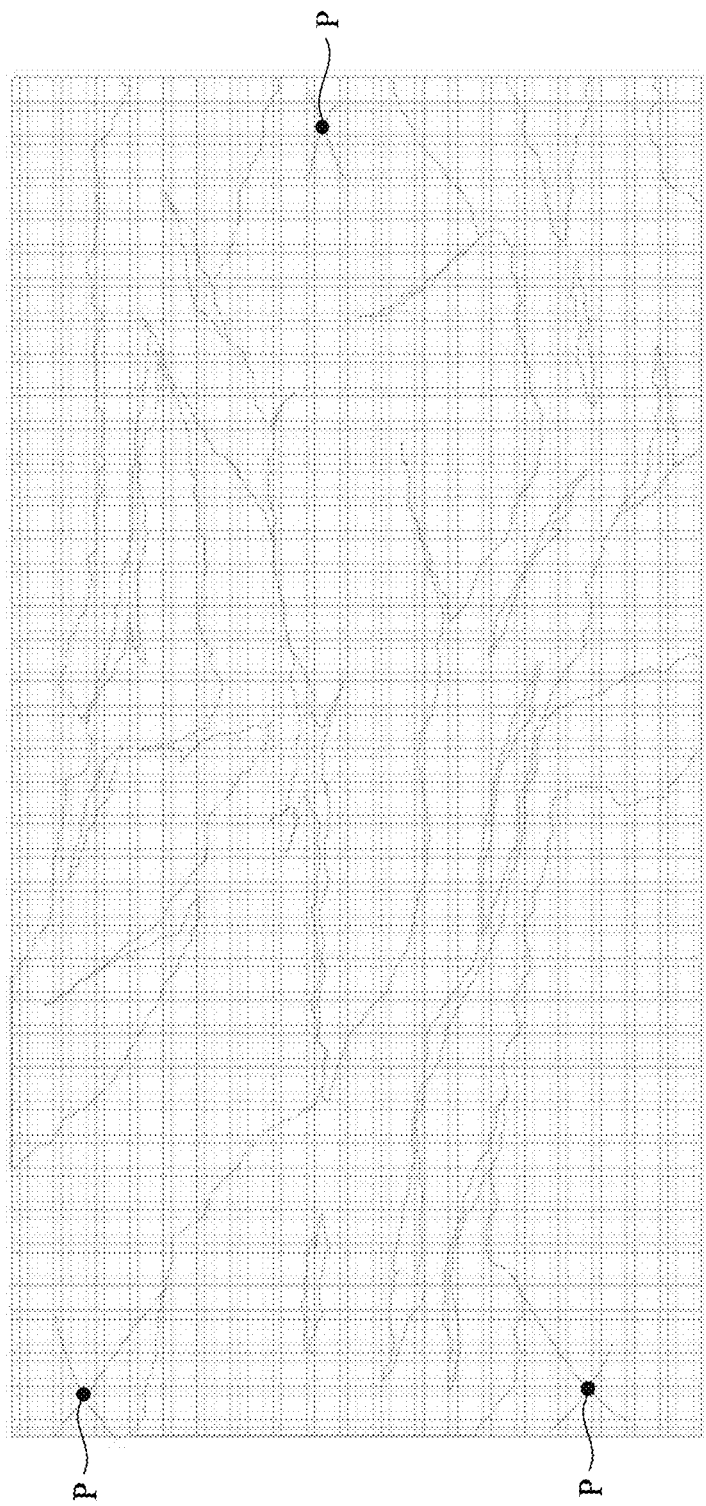
FIG. 4 is a schematic diagram of a vein pattern, in accordance with some embodiments.
Figure 5:
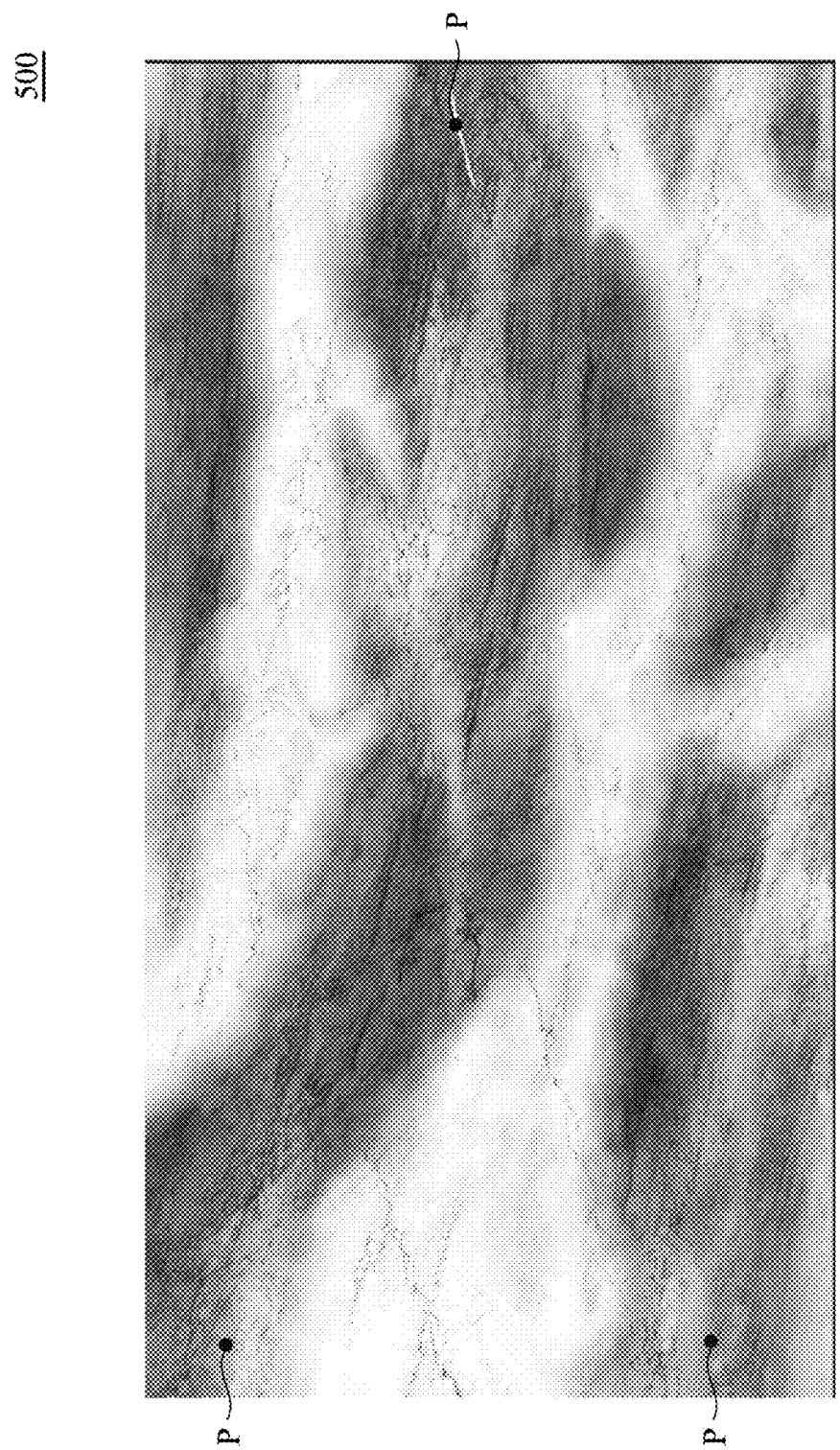
FIG. 5 is a schematic diagram of printing the vein pattern of FIG. 4 on a front surface of the engineered stone, in accordance with some embodiments.

FIG. 4 is a schematic diagram of a vein pattern 400, in accordance with some embodiments. FIG. 4 shows that three reference points P are set in the vein pattern 400. However, in other embodiments, more than three reference points P may also be set. As shown, the reference point P is set at a position that may not change relatively in subsequent processes. In FIG. 4, the reference point P is set at the intersection of the pattern. FIG. 5 is a schematic diagram of printing the vein pattern 400 of FIG. 4 on a front surface 500 of the engineered stone, in accordance with some embodiments. The position of the corresponding reference points P are also shown in FIG. 5.

Figure 6:
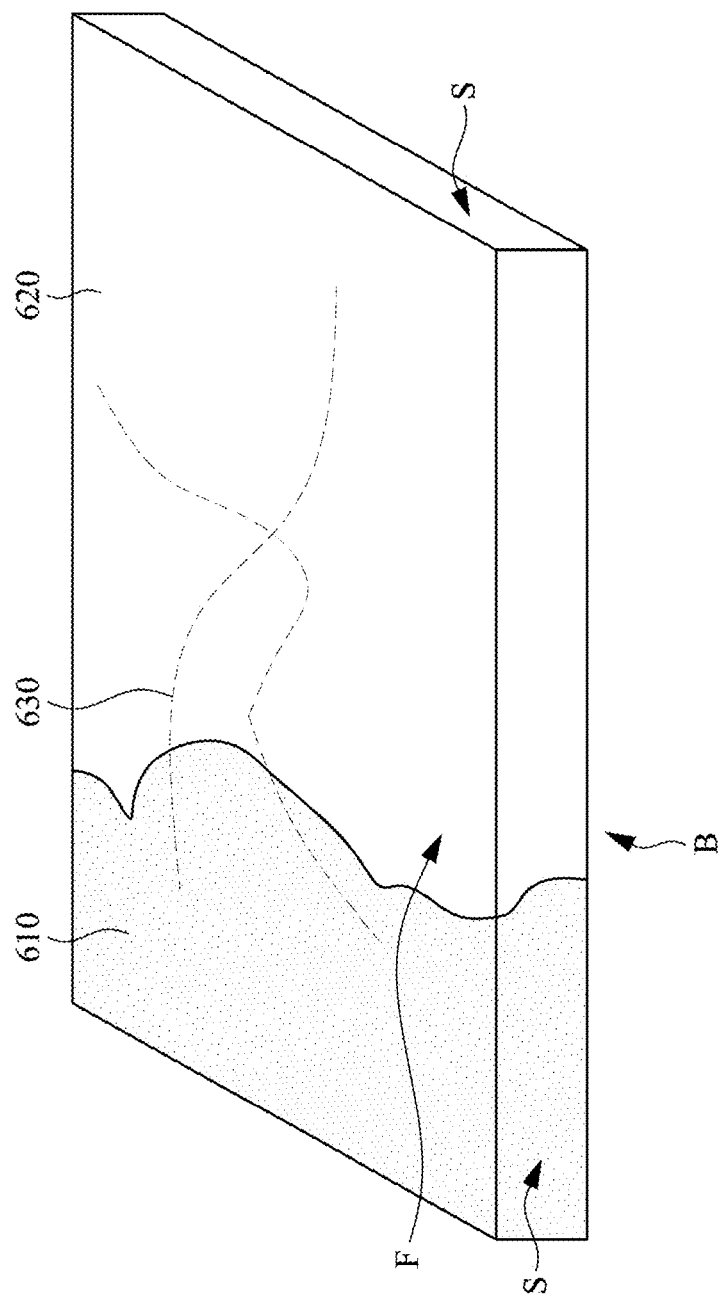
FIG. 6 is a schematic diagram of an engineered stone, in accordance with some embodiments.

FIG. 6 is a three dimensional schematic diagram of an engineered stone 600, in accordance with some embodiments. The engineered stone 600 includes a first full-body stone pattern 610, a second full-body stone pattern 620 and printed stone pattern 630. As shown, the first full-body stone pattern 610 is located on a front surface F, side surfaces S and a back surface B of the engineered stone 600, and the second full-body stone pattern 620 is located on a front surface F, side surfaces S and a back surface B of the engineered stone 600. In other words, the first full-body stone pattern 610 and the second full-body stone pattern 620 extend from the front surface F to the back surface B. As shown, the printed stone pattern 630 is located on the front surface F of the engineered stone 600. As mentioned above, the first full-body stone pattern 610 and the second full-body stone pattern 620 are formed according to the background pattern, and the printed stone pattern 630 is formed according to the vein pattern. In some embodiments, the first full-body stone pattern 610 and the second full-body stone pattern 620 have different colors.

Referring to Table 1 below for the durability test results of the engineered stone of the above embodiment. The durability test in Table 1 include using the above method to produce engineered stone printed with pure colors, for example, CMYK (cyan, magenta, yellow, black) engineered stone samples. The pure color engineered stone samples are placed in an ultraviolet (UV) tester for ASTM G154 testing to simulate the color changes over time outdoors of the pure color engineered stone sample. The durability test is more stringent than the environment in which engineered stone is normally used. The durability test includes a blank group and three experimental groups. The blank group is not placed in the UV tester, and the three experimental groups are placed in the UV tester for 24 hours (hr), 48 hr and 72 hr respectively. Table 1 shows the color difference ($\Delta E$) measured between the chromaticity values of the three experimental groups and the blank group using a colorimeter. The larger the color difference, the greater the color change.

TABLE 1

|  | C | M | Y | K |
|---|---|---|---|---|
| $\Delta E$(24 hr) | 0.38 | 0.26 | 0.64 | 0.95 |
| $\Delta E$(48 hr) | 1.22 | 0.96 | 1.4 | 2.09 |
| $\Delta E$(72 hr) | 1.98 | 2.16 | 2.78 | 3.17 |

As shown in Table 1, the engineered stone produced by the method disclosed in the present disclosure has good durability, and the printed stone pattern on the engineered stone in present disclosure is not easy to change color or fade.

The engineered stone manufacturing method in the present disclosure can produce exquisite and realistic engineered stone. By setting reference points in the background pattern, vein pattern, and stone mold, the vein pattern to be printed can be accurately positioned during the transfer process. Moreover, the weather-resistant ink of the present disclosure contains a wetting and dispersing agent, the weather-resistant ink can stably combine the dye with the engineered stone and prevent it from discoloration or fading. The engineered stone produce by the method of the present disclosure has a full-body stone pattern extending from the front surface to the back surface, which can reduce the labor cost of treatment the side surface in the subsequent process.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A manufacturing method of an engineered stone, comprising:
    taking a photo of a natural stone slab to obtain a stone slab photo;
    importing the stone slab photo into a color mapping software, wherein a background pattern and a vein pattern are designed, and a plurality of reference points are set based on the stone slab photo;
    designing a stone mold based on the background pattern and the vein pattern, wherein a plurality of mold reference points are set in the stone mold based on the plurality of reference points;
    forming a full-body stone slab with the stone mold, wherein a plurality of alignment marks is made on a front surface of the full-body stone slab, and the plurality of alignment marks corresponding to the plurality of mold reference points of the stone mold;
    spraying the vein pattern onto a first surface of a paper with a weather-resistant ink;
    cutting holes on the paper to form a plurality of reference point holes, and the plurality of reference point holes corresponding to the positions of the reference points of the vein pattern;
    covering the first surface of the paper on the front surface of the full-body stone slab, and aligning the plurality of reference point holes on the paper with the plurality of alignment marks on the full-body stone slab, respectively; and
    performing a thermal transfer process to transfer the vein pattern to the front surface of the full-body stone slab.

2. The method of claim 1, wherein forming the full-body stone slab comprises:
    preparing a first stone formulation and a second stone formulation based on the background pattern; and
    disposing the first stone formulation into a first area of the stone mold to form a first full-body stone pattern, and disposing the second stone formulation into a second area of the stone mold to form a second full-body stone pattern.

3. The method of claim 2, wherein the first full-body stone pattern and the second full-body stone pattern are located on the front surface, a plurality of side surface and a back surface of the full-body stone slab, wherein the back surface is opposite to the front surface.

4. The method of claim 1, wherein a number of the plurality of reference points is at least three.

5. The method of claim 1, wherein taking the photo of the natural stone slab comprises:
    using a uniform light source and placing a color calibration plate next to the natural stone slab.

6. The method of claim 1, wherein performing a thermal transfer process comprises:
    setting a temperature of a heat press machine between 14° and 200° C., and placing the full-body stone slab in the heat press machine for 15 to 30 minutes.

7. The method of claim 1, wherein the weather-resistant ink comprises: 55-65% by weight of deionized water, 8-12% by weight of propylene glycol, 12-15% by weight of glycerin, 10-20% by weight of dispersing dye, 10-20% by weight of wetting and dispersing agent, 0.2-1.5% by weight of UV absorber, and 0.5 to 2% by weight of hindered amine light stabilizer.

8. The method of claim 1, wherein prior to performing the thermal transfer process, a polishing process is performed on the front surface of the full-body stone slab.

* * * * *